(12) United States Patent
Guerrero (10) Patent No.: US 7,461,587 B2
(45) Date of Patent: *Dec. 9, 2008

(54) BEVERAGE CONTAINER WITH WIRE CLOTH FILTER

(76) Inventor: Victor Guerrero, 2139 Lincoln Way, San Francisco, CA (US) 94122

(*) Notice: Subject to any disclaimer, the term of this patent is extended or adjusted under 35 U.S.C. 154(b) by 233 days.

This patent is subject to a terminal disclaimer.

(21) Appl. No.: 11/517,078

(22) Filed: Sep. 7, 2006

(65) Prior Publication Data

US 2007/0062376 A1    Mar. 22, 2007

Related U.S. Application Data

(63) Continuation of application No. 10/762,831, filed on Jan. 21, 2004, now Pat. No. 7,318,374.

(60) Provisional application No. 60/724,212, filed on Oct. 5, 2005, provisional application No. 60/715,043, filed on Sep. 7, 2005.

(51) Int. Cl.
*A47J 31/00*   (2006.01)
*A47G 19/22*   (2006.01)

(52) U.S. Cl. .................. 99/323; 99/322; 210/474; 210/475

(58) Field of Classification Search ............... 99/322, 99/321, 323, 317, 306; 220/713, 521, 501, 220/371, 372, 711, 719; 210/473, 475, 477
See application file for complete search history.

(56) References Cited

U.S. PATENT DOCUMENTS

| | | | |
|---|---|---|---|
| 741,547 A | 10/1903 | Renner | |
| 2,133,166 A * | 10/1938 | Fritsche | 99/323 |
| 3,960,652 A | 6/1976 | Conway et al. | 162/108 |
| 4,031,039 A | 6/1977 | Mizumoto et al. | 521/46.5 |
| 4,059,609 A | 11/1977 | Rinehart | 558/241 |
| 4,059,652 A | 11/1977 | Allan et al. | 525/135 |
| 4,101,627 A | 7/1978 | Menier | 264/323 |
| 4,103,602 A | 8/1978 | Oggioni et al. | 99/289 D |
| 4,158,329 A | 6/1979 | McKnight | 99/295 |
| 4,207,809 A | 6/1980 | Brill | 99/279 |
| 4,221,670 A | 9/1980 | Ziemek | |
| 4,243,876 A | 1/1981 | Engel et al. | 235/455 |
| 4,253,825 A | 3/1981 | Fasano | 432/149 |
| 4,298,167 A | 11/1981 | Stahl et al. | 239/129 |
| 4,323,160 A | 4/1982 | Cowgill | 209/632 |
| 4,331,696 A | 5/1982 | Bruce, III | 426/595 |
| 4,338,181 A | 7/1982 | Solomon | 204/294 |
| 4,354,917 A | 10/1982 | Solomon | 204/284 |
| 4,354,958 A | 10/1982 | Solomon | 502/101 |
| 4,357,262 A | 11/1982 | Solomon | 502/101 |
| 4,364,805 A | 12/1982 | Rogers | 205/531 |
| 4,364,806 A | 12/1982 | Rogers | 205/533 |
| 4,364,979 A | 12/1982 | Dutton | 482/2 |
| 4,370,284 A | 1/1983 | Solomon | 264/42 |

(Continued)

OTHER PUBLICATIONS

ZAK Product on Website http://www.zak.com/com.

*Primary Examiner*—Reginald L Alexander
(74) *Attorney, Agent, or Firm*—Gordon & Rees LLP (57) ABSTRACT

A beverage cup assembly, including: a cup; a lid at a top of the cup; a wire mesh filter assembly adjacent to the lid; and a receptacle receivable around the filter assembly comprising a one-way valve permitting fluid to flow from the receptacle into the cup.

3 Claims, 10 Drawing Sheets

U.S. PATENT DOCUMENTS

| | | | |
|---|---|---|---|
| 4,370,473 A | 1/1983 | Marev et al. ............... 536/2 |
| 4,379,034 A | 4/1983 | Rogers ..................... 205/531 |
| 4,382,875 A | 5/1983 | Solomon ................... 502/101 |
| 4,397,676 A | 8/1983 | Bakel ........................ 504/206 |
| 4,409,045 A | 10/1983 | Busse ......................... 156/69 |
| 4,422,918 A | 12/1983 | Inoue ........................ 204/206 |
| 4,429,623 A | 2/1984 | Illy ............................ 99/295 |
| 4,440,617 A | 4/1984 | Solomon ............... 204/290.11 |
| 4,456,521 A | 6/1984 | Solomon et al. .......... 204/292 |
| 4,459,197 A | 7/1984 | Solomon ................... 204/292 |
| 4,465,649 A | 8/1984 | Johnson ....................... 264/51 |
| 4,468,362 A | 8/1984 | Solomon ..................... 264/127 |
| 4,473,003 A | 9/1984 | Stone, Jr. ..................... 99/305 |
| 4,490,335 A | 12/1984 | Marev et al. ............... 422/269 |
| 4,500,019 A | 2/1985 | Curley, Jr. ................... 224/222 |
| 4,510,019 A | 4/1985 | Bartelloni ................... 162/141 |
| 4,518,705 A | 5/1985 | Solomon et al. .......... 502/101 |
| 4,520,950 A | 6/1985 | Jeans ..................... 222/129.1 |
| 4,542,176 A | 9/1985 | Graham ...................... 524/543 |
| 4,550,027 A | 10/1985 | Stone, Jr. ................... 426/433 |
| 4,582,666 A | 4/1986 | Kenworthy et al. ......... 264/557 |
| 4,591,508 A | 5/1986 | Pultinas, Jr. ............... 426/595 |
| 4,624,177 A | 11/1986 | Ito et al. ....................... 99/286 |
| 4,629,589 A | 12/1986 | Gupta ...................... 261/34.1 |
| 4,630,975 A | 12/1986 | Becker ......................... 406/85 |
| 4,640,839 A | 2/1987 | Hsu ............................ 426/285 |
| 4,650,583 A | 3/1987 | Bondanini ................. 210/474 |
| 4,666,390 A | 5/1987 | Kenworthy et al. ........... 425/86 |
| 4,667,584 A | 5/1987 | Koyama et al. ............. 99/280 |
| 4,667,654 A | 5/1987 | Thaler et al. ................ 127/65 |
| 4,680,185 A | 7/1987 | Illk |
| 4,683,666 A | 8/1987 | Igusa et al. ..................... 34/67 |
| 4,702,799 A | 10/1987 | Tuot ......................... 159/48.1 |
| 4,721,035 A | 1/1988 | Chang-Diaz ................. 99/297 |
| 4,721,395 A | 1/1988 | Olsson et al. ............... 366/348 |
| 4,724,620 A | 2/1988 | Hsu ............................ 34/174 |
| 4,728,425 A | 3/1988 | Sandvig |
| 4,735,935 A | 4/1988 | McAnalley ................... 514/53 |
| 4,762,764 A | 8/1988 | Ng et al. .................... 430/115 |
| 4,779,519 A | 10/1988 | Giuliano ....................... 99/275 |
| 4,809,594 A | 3/1989 | Vitous ........................... 99/280 |
| 4,821,630 A * | 4/1989 | Roberts ........................ 99/323 |
| 4,830,645 A | 5/1989 | Ghodsizadeh et al. ......... 62/541 |
| 4,832,951 A | 5/1989 | Chang-Diaz ................. 424/520 |
| 4,851,224 A | 7/1989 | McAnalley ................. 424/744 |
| 4,859,248 A | 8/1989 | Thaler et al. .................. 127/32 |
| 4,867,880 A | 9/1989 | Pelle et al. ................... 210/474 |
| 4,877,694 A | 10/1989 | Solomon et al. .............. 429/27 |
| 4,917,890 A | 4/1990 | McAnalley ................. 424/744 |
| 4,928,584 A | 5/1990 | Young ........................... 99/289 |
| 4,957,907 A | 9/1990 | McAnalley ................... 514/54 |
| 4,959,214 A | 9/1990 | McAnalley ................. 424/744 |
| 4,966,892 A | 10/1990 | McAnalley ................... 514/54 |
| 4,980,215 A | 12/1990 | Schonbrun ..................... 428/72 |
| 4,986,172 A | 1/1991 | Hunnicutt, Jr. |
| 5,015,394 A | 5/1991 | McEllhenney et al. ....... 210/744 |
| 5,030,473 A | 7/1991 | Ghodsizadeh ............... 426/650 |
| 5,068,979 A | 12/1991 | Wireman et al. ............... 34/58 |
| 5,085,847 A | 2/1992 | Shaffer et al. ............... 423/474 |
| 5,099,861 A | 3/1992 | Clearman et al. ........... 131/194 |
| 5,112,638 A | 5/1992 | Cagley et al. ............... 426/640 |
| 5,121,855 A | 6/1992 | Credle, Jr. ................ 222/129.2 |
| 5,135,744 A | 8/1992 | Alexander et al. ........ 424/78.17 |
| 5,137,744 A | 8/1992 | Cagley et al. ............... 426/615 |
| 5,149,398 A | 9/1992 | Shaffer et al. ............... 159/4.01 |
| 5,154,111 A | 10/1992 | Luciano ................... 99/289 R |
| 5,155,923 A | 10/1992 | Wireman et al. ............... 34/318 |
| 5,159,764 A | 11/1992 | Wireman et al. ............... 34/359 |
| 5,176,830 A | 1/1993 | Wiggins ..................... 210/477 |
| 5,182,926 A | 2/1993 | Carns et al. ................... 62/352 |
| 5,190,653 A | 3/1993 | Herrick et al. .............. 210/477 |
| 5,195,422 A | 3/1993 | Newnan ....................... 99/283 |
| 5,207,993 A | 5/1993 | Burris ......................... 422/256 |
| 5,214,998 A | 6/1993 | Konoeda ..................... 99/275 |
| 5,222,364 A | 6/1993 | Carns et al. ................... 62/600 |
| 5,230,278 A | 7/1993 | Bunn et al. ............... 99/289 R |
| 5,230,281 A | 7/1993 | Wireman et al. ............. 99/483 |
| 5,252,136 A | 10/1993 | Desforges et al. .............. 127/29 |
| 5,253,578 A | 10/1993 | Hsu ............................. 99/275 |
| 5,255,593 A | 10/1993 | Bunn et al. ................... 99/280 |
| 5,258,197 A | 11/1993 | Wheeler et al. ............. 426/607 |
| 5,265,518 A | 11/1993 | Reese et al. .................. 99/280 |
| 5,265,520 A | 11/1993 | Giuliano ................... 99/323.1 |
| 5,277,810 A | 1/1994 | Shepard ..................... 210/464 |
| 5,284,170 A | 2/1994 | Larsen .......................... 134/44 |
| 5,287,591 A | 2/1994 | Rench et al. ................... 15/328 |
| 5,292,005 A | 3/1994 | Wireman et al. ............... 55/451 |
| 5,297,992 A | 3/1994 | Bailey et al. ............... 454/339 |
| 5,300,746 A | 4/1994 | Walters et al. ............. 219/745 |
| 5,303,639 A | 4/1994 | Bunn et al. ............... 99/289 R |
| 5,305,924 A | 4/1994 | Groover et al. ........... 222/129.1 |
| 5,307,538 A | 5/1994 | Rench et al. ................... 15/352 |
| 5,309,820 A | 5/1994 | Baxter et al. .................. 99/280 |
| 5,323,623 A | 6/1994 | Carns et al. ................... 62/352 |
| 5,352,888 A | 10/1994 | Childress ................. 250/223 R |
| 5,360,620 A | 11/1994 | Hsu .............................. 426/432 |
| 5,363,535 A | 11/1994 | Rench ........................... 15/344 |
| 5,364,508 A | 11/1994 | Weres et al. ................. 205/334 |
| 5,372,832 A | 12/1994 | Bunn et al. ................. 426/433 |
| 5,378,490 A | 1/1995 | Wheeler et al. ............. 426/606 |
| 5,393,540 A | 2/1995 | Bunn et al. ................. 426/231 |
| 5,399,370 A | 3/1995 | Hsu ............................. 426/432 |
| 5,411,756 A | 5/1995 | Wheeler et al. ............. 473/332 |
| 5,417,255 A | 5/1995 | Sanfilippo et al. ............... 141/1 |
| 5,456,893 A | 10/1995 | Silver ......................... 422/268 |
| 5,456,939 A | 10/1995 | Wheeler et al. ............. 426/660 |
| 5,471,917 A | 12/1995 | Hsu ............................. 99/536 |
| 5,544,566 A | 8/1996 | Bersten ....................... 99/287 |
| 5,552,174 A | 9/1996 | Wheeler et al. ............. 426/607 |
| 5,559,673 A | 9/1996 | Gagnon et al. .............. 361/695 |
| 5,565,232 A | 10/1996 | Wheeler et al. ............. 426/607 |
| 5,589,216 A | 12/1996 | Guskey et al. .............. 426/607 |
| 5,617,705 A | 4/1997 | Sanfilippo et al. ............. 53/432 |
| 5,628,902 A | 5/1997 | Pytlik et al. |
| 5,635,233 A | 6/1997 | Levinson .................... 426/433 |
| 5,638,741 A | 6/1997 | Cisaria ........................ 99/295 |
| 5,662,953 A | 9/1997 | Wheeler et al. ............... 426/2 |
| 5,678,472 A | 10/1997 | Millman ....................... 99/279 |
| 5,680,951 A * | 10/1997 | Feltman et al. ............. 220/253 |
| 5,698,101 A | 12/1997 | Kopp et al. ............. 210/500.23 |
| 5,700,464 A | 12/1997 | Silver ......................... 424/123 |
| 5,782,698 A | 7/1998 | Keller .......................... 472/61 |
| 5,813,318 A | 9/1998 | Zanin et al. .................. 99/291 |
| 5,863,301 A | 1/1999 | Grosso et al. ................. 44/301 |
| 5,874,263 A | 2/1999 | Holtzapple et al. .......... 435/136 |
| 5,891,433 A | 4/1999 | Silver ......................... 424/123 |
| 5,913,963 A | 6/1999 | King ......................... 99/302 P |
| 5,913,964 A * | 6/1999 | Melton ........................ 99/322 |
| 5,916,110 A | 6/1999 | Sanfilippo et al. ............. 53/510 |
| 5,927,179 A | 7/1999 | Mordini et al. ............... 99/304 |
| 5,943,790 A | 8/1999 | Gell, Jr. ......................... 34/66 |
| 5,958,497 A | 9/1999 | Grimm et al. ............... 426/596 |
| 5,961,000 A | 10/1999 | Sanfilippo et al. ........... 222/152 |
| 5,962,307 A | 10/1999 | Holtzapple et al. ........ 435/294.1 |
| 5,970,850 A | 10/1999 | Piazza ........................ 99/303 |
| 5,974,899 A | 11/1999 | Hanks ....................... 73/863.12 |
| 5,989,696 A | 11/1999 | McCarthy et al. ........... 427/356 |
| 6,015,913 A | 1/2000 | Kealey et al. ............... 549/386 |
| 6,032,438 A | 3/2000 | Sanfilippo et al. ............. 53/432 |
| 6,063,402 A | 5/2000 | Gebert et al. ................ 424/464 |
| 6,079,314 A | 6/2000 | Mackinnon ............... 99/289 R |
| 6,079,315 A | 6/2000 | Beaulieu et al. .......... 99/289 R |
| 6,079,317 A | 6/2000 | Fukushima ............... 99/302 R |
| 6,079,626 A | 6/2000 | Hartman ....................... 236/13 |

| | | | | | | | |
|---|---|---|---|---|---|---|---|
| 6,090,349 | A | 7/2000 | Hirano ................... 422/124 | 6,490,883 | B2 | 12/2002 | Trembley et al. ............ 62/637 |
| 6,090,427 | A | 7/2000 | Mazurek et al. ............ 426/534 | 6,521,916 | B2 | 2/2003 | Roberts et al. ............ 257/100 |
| 6,112,437 | A | 9/2000 | Lovitt ................... 36/137 | 6,542,927 | B2 | 4/2003 | Rhoads ................... 709/217 |
| 6,114,667 | A | 9/2000 | Balandier et al. ........... 219/438 | 6,546,795 | B1 | 4/2003 | Dietz ................... 73/290 R |
| 6,161,470 | A | 12/2000 | Justus | 6,561,317 | B1 | 5/2003 | Dudley ................... 186/38 |
| 6,173,506 | B1 | 1/2001 | Kruepke et al. ............ 34/68 | 6,581,915 | B2 | 6/2003 | Bartsch et al. ............ 261/26 |
| 6,182,554 | B1 | 2/2001 | Beaulieu et al. ........... 99/289 R | 6,582,747 | B2 | 6/2003 | Myers et al. ............ 426/593 |
| 6,189,438 | B1 | 2/2001 | Bielfeldt et al. | 6,616,094 | B2 | 9/2003 | Illingworth ................ 244/12.1 |
| 6,194,020 | B1 | 2/2001 | Myers et al. ............ 426/631 | 6,658,989 | B2 | 12/2003 | Sweeney |
| 6,196,422 | B1 | 3/2001 | Tuyls et al. ............ 222/129.1 | 6,732,635 | B2 * | 5/2004 | Jensen et al. ............ 99/322 |
| 6,199,318 | B1 | 3/2001 | Stewart et al. ............ 47/57.6 | 2001/0007693 | A1 | 7/2001 | Myers et al. ............ 426/631 |
| 6,202,542 | B1 | 3/2001 | Melton | 2001/0011660 | A1 | 8/2001 | Schroeder et al. ........ 222/129.1 |
| 6,202,543 | B1 | 3/2001 | Moya et al. ............ 99/330 | 2001/0030308 | A1 | 10/2001 | Schroeder et al. ...... 251/129.15 |
| 6,221,245 | B1 | 4/2001 | Colburn ................... 210/223 | 2001/0032672 | A1 | 10/2001 | Schroeder et al. ............ 137/383 |
| 6,223,948 | B1 | 5/2001 | Davis ................... 222/132 | 2001/0037584 | A1 | 11/2001 | Behm ................... 34/218 |
| 6,226,909 | B1 | 5/2001 | Banning ................... 40/576 | 2002/0016915 | A1 | 2/2002 | Rhoads ................... 709/203 |
| 6,235,039 | B1 | 5/2001 | Parkin et al. ............ 606/131 | 2002/0020301 | A1 | 2/2002 | Verhoef |
| 6,242,121 | B1 | 6/2001 | Pedicini et al. ............ 429/27 | 2002/0035928 | A1 | 3/2002 | Kataoka |
| 6,250,208 | B1 | 6/2001 | Helps et al. ............ 99/299 | 2002/0066798 | A1 | 6/2002 | Laudemiel-Pellet et al. ... 239/34 |
| 6,271,001 | B1 | 8/2001 | Clarke et al. ............ 435/72 | 2002/0066967 | A1 | 6/2002 | Bartsch et al. ............ 261/26 |
| 6,272,973 | B1 | 8/2001 | Fukushima et al. ........... 99/280 | 2002/0068009 | A1 | 6/2002 | Laudamiel-Pellet et al. .... 422/5 |
| 6,276,262 | B1 | 8/2001 | Chen | 2002/0068010 | A1 | 6/2002 | Laudamiel-Pellet et al. .... 422/5 |
| 6,279,461 | B1 | 8/2001 | Fukushima et al. ............ 99/299 | 2002/0070156 | A1 | 6/2002 | Melgaard et al. ............ 210/299 |
| 6,291,144 | B1 | 9/2001 | Aylward et al. ............ 430/359 | 2002/0071868 | A1 | 6/2002 | Jia ................... 424/486 |
| 6,311,214 | B1 | 10/2001 | Rhoads ................... 709/217 | 2002/0071890 | A1 | 6/2002 | Budwig et al. ............ 426/386 |
| 6,328,181 | B1 | 12/2001 | Schroeder et al. ........ 222/129.1 | 2002/0107187 | A1 | 8/2002 | Kingston et al. ............ 514/12 |
| 6,333,180 | B1 | 12/2001 | Farbood et al. ............ 435/148 | 2002/0131076 | A1 | 9/2002 | Davis ................... 358/1.15 |
| 6,335,548 | B1 | 1/2002 | Roberts et al. ............ 257/98 | 2002/0134249 | A1 | 9/2002 | Melton |
| 6,340,036 | B1 | 1/2002 | Toyoizumi et al. ........... 141/275 | 2002/0136819 | A1 | 9/2002 | Myers et al. ............ 426/631 |
| 6,350,594 | B1 | 2/2002 | Clarke et al. ............ 435/72 | 2002/0148772 | A1 | 10/2002 | Kataoka |
| 6,368,759 | B1 | 4/2002 | Bordelais et al. ............ 430/15 | 2002/0164410 | A1 | 11/2002 | Ogden et al. ............ 426/506 |
| 6,371,756 | B1 | 4/2002 | Toohey ................... 431/291 | 2002/0169116 | A1 | 11/2002 | Kingston et al. ............ 514/12 |
| 6,372,267 | B1 | 4/2002 | Kealey et al. ............ 424/776 | 2002/0187925 | A1 | 12/2002 | Kingston et al. ............ 514/2 |
| 6,382,087 | B1 | 5/2002 | Iiyama ................... 99/355 | 2003/0008059 | A1 | 1/2003 | Macinnes et al. ........... 426/590 |
| 6,395,311 | B2 | 5/2002 | Jia ................... 424/744 | 2003/0035917 | A1 | 2/2003 | Hyman ................... 428/67 |
| 6,399,139 | B2 | 6/2002 | Myers et al. ............ 426/631 | 2003/0040957 | A1 | 2/2003 | Rodriguez et al. ............ 705/14 |
| 6,428,931 | B1 | 8/2002 | Golovin ................... 429/224 | 2003/0041739 | A1 | 3/2003 | Cai ................... 99/287 |
| 6,432,113 | B1 | 8/2002 | Parkin et al. ............ 606/131 | 2003/0045676 | A1 | 3/2003 | Kingston et al. ............ 530/311 |
| 6,436,620 | B1 | 8/2002 | Aylward et al. ............ 430/503 | 2003/0082360 | A1 | 5/2003 | O'Donnell et al. ....... 428/292.1 |
| 6,443,335 | B1 | 9/2002 | Pinedjian et al. ............ 222/504 | 2003/0087103 | A1 | 5/2003 | Belmares et al. ............ 428/421 |
| 6,443,590 | B1 | 9/2002 | Lovitt ................... 362/103 | 2003/0148300 | A1 | 8/2003 | Valentin et al. ............ 435/6 |
| 6,444,609 | B1 | 9/2002 | Golovin ................... 503/324 | 2003/0148965 | A1 | 8/2003 | Hofer et al. ............ 514/28 |
| 6,458,569 | B1 | 10/2002 | Farbood et al. ............ 435/148 | 2003/0164557 | A1 | 9/2003 | Chung et al. ............ 261/26 |
| 6,460,451 | B1 | 10/2002 | Helman et al. ............ 99/323.5 | 2003/0168751 | A1 | 9/2003 | Bartsch et al. ............ 261/26 |
| 6,464,459 | B2 | 10/2002 | Illingworth ............... 415/208.2 | 2003/0173376 | A1 | 9/2003 | Bilskie et al. ............ 222/129.1 |
| 6,470,597 | B1 | 10/2002 | Stipp ................... 34/422 | | | | |

\* cited by examiner

BEVERAGE CONTAINER WITH WIRE CLOTH FILTER

RELATED APPLICATIONS

This application claims priority to U.S. Provisional Applications No. 60/715,043, filed Sep. 7, 2005; entitled "Coffee Cup Filter And O-Ring Seal"; and No. 60/724,212 filed Oct. 5, 2005; entitled "Beverage Container With Wire Cloth Filter Insert". In addition, the present application is a continuation of pending U.S. patent application Ser. No. 10/762,831, filed Jan. 1, 2004, entitled "Wire Cloth Filtering Systems".

TECHNICAL FIELD

The present invention relates to beverage cups.

BACKGROUND OF THE INVENTION

Persons who drink coffee or tea have traditionally brewed their coffee or tea in one apparatus, and then poured the brewed beverage into their drinking cup. A need exists, therefore, for a more convenient system in which the user is able to both brew the beverage in, and drink the beverage from, the same device.

SUMMARY OF THE INVENTION

The present invention provides a beverage cup assembly, including: a cup; a lid at a top of the cup; a mesh filter assembly adjacent to the lid; and a receptacle receivable around the filter assembly comprising a one-way valve permitting fluid to flow from the receptacle into the cup. The one-way valve may optionally be a flap in the receptacle.

An advantage of the present system is that it is used both to brew a beverage, and also as a drinking cup.

An advantage of using a wire cloth filter is that it does not need to be replaced after each use (unlike a paper filter).

DETAILED DESCRIPTION OF THE DRAWINGS

Figure 5:
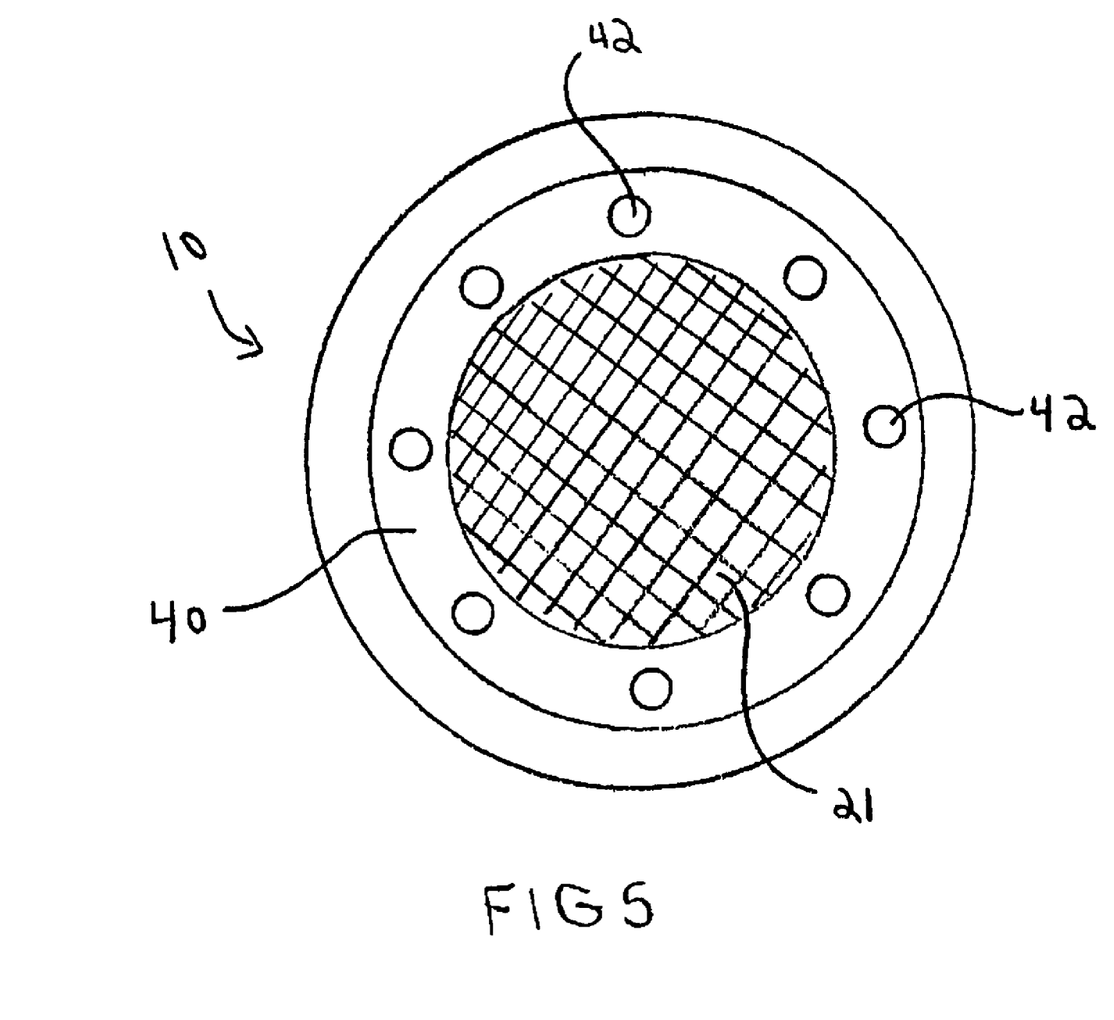
FIG. 5 is a top plan view with the lid of the beverage container removed.
Figure 6:
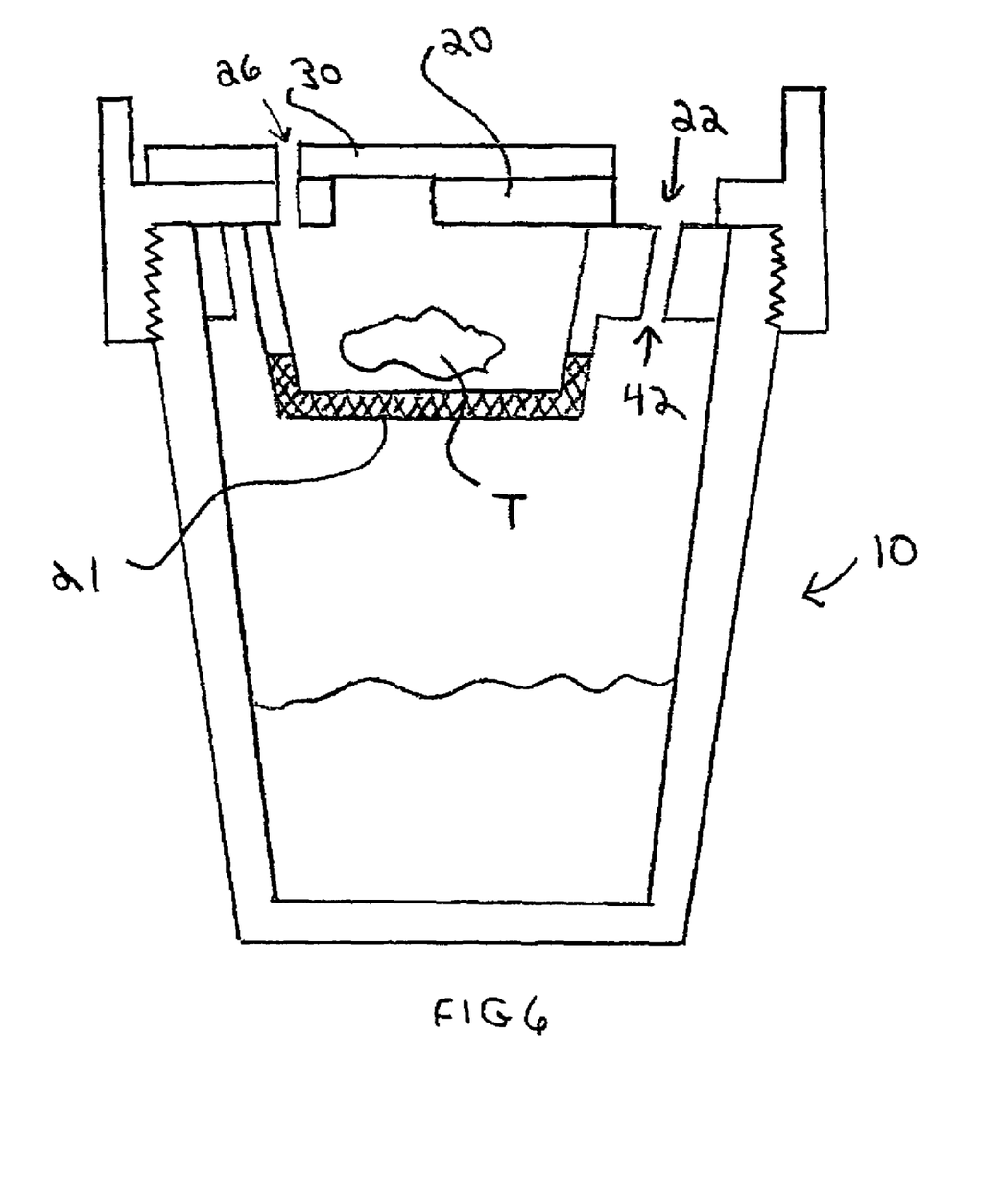
FIG. 6 is a sectional side elevation view of another preferred embodiment of present beverage container ready for drinking therefrom.
Figure 7:
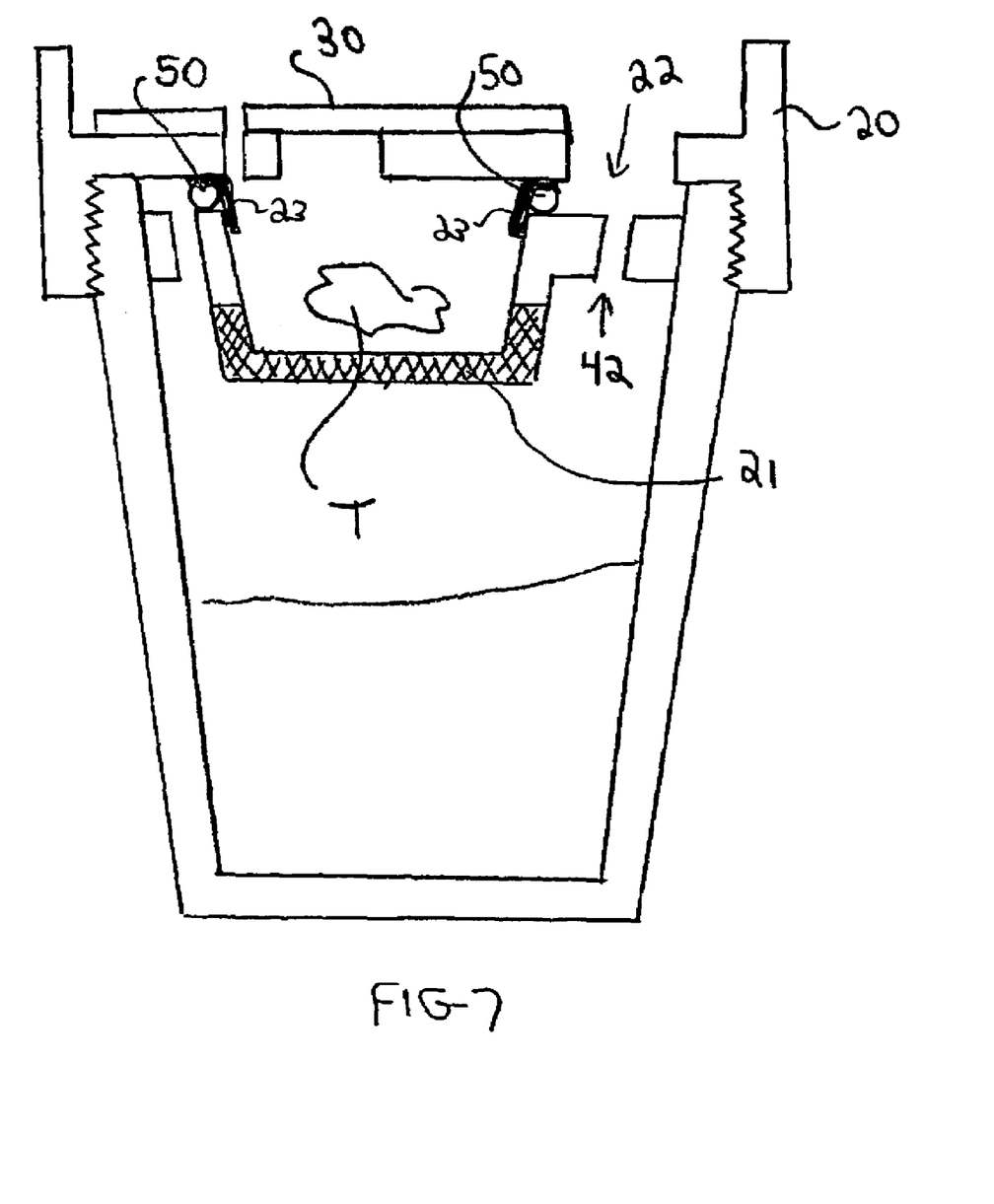
FIG. 7 is a sectional side elevation view of yet another preferred embodiment of present beverage container ready for drinking therefrom. This embodiment incorporates an O-ring seal adjacent to the filter.
Figure 8:
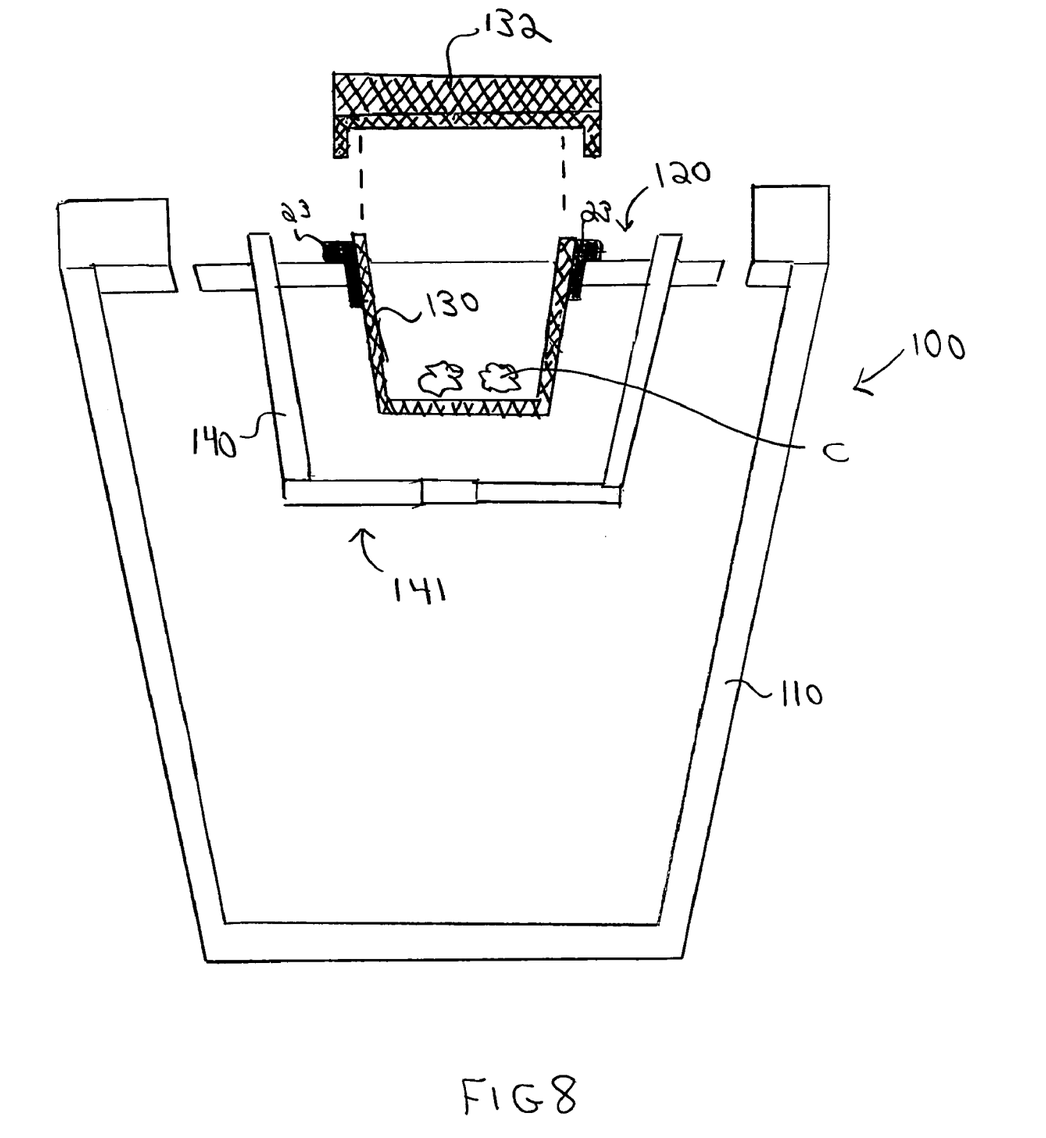
FIG. 8 is a sectional side elevation view of yet another preferred embodiment of present beverage container prior to use. This embodiment incorporates a one-way flow valve in a fluid receptacle around the filter.
Figure 9:
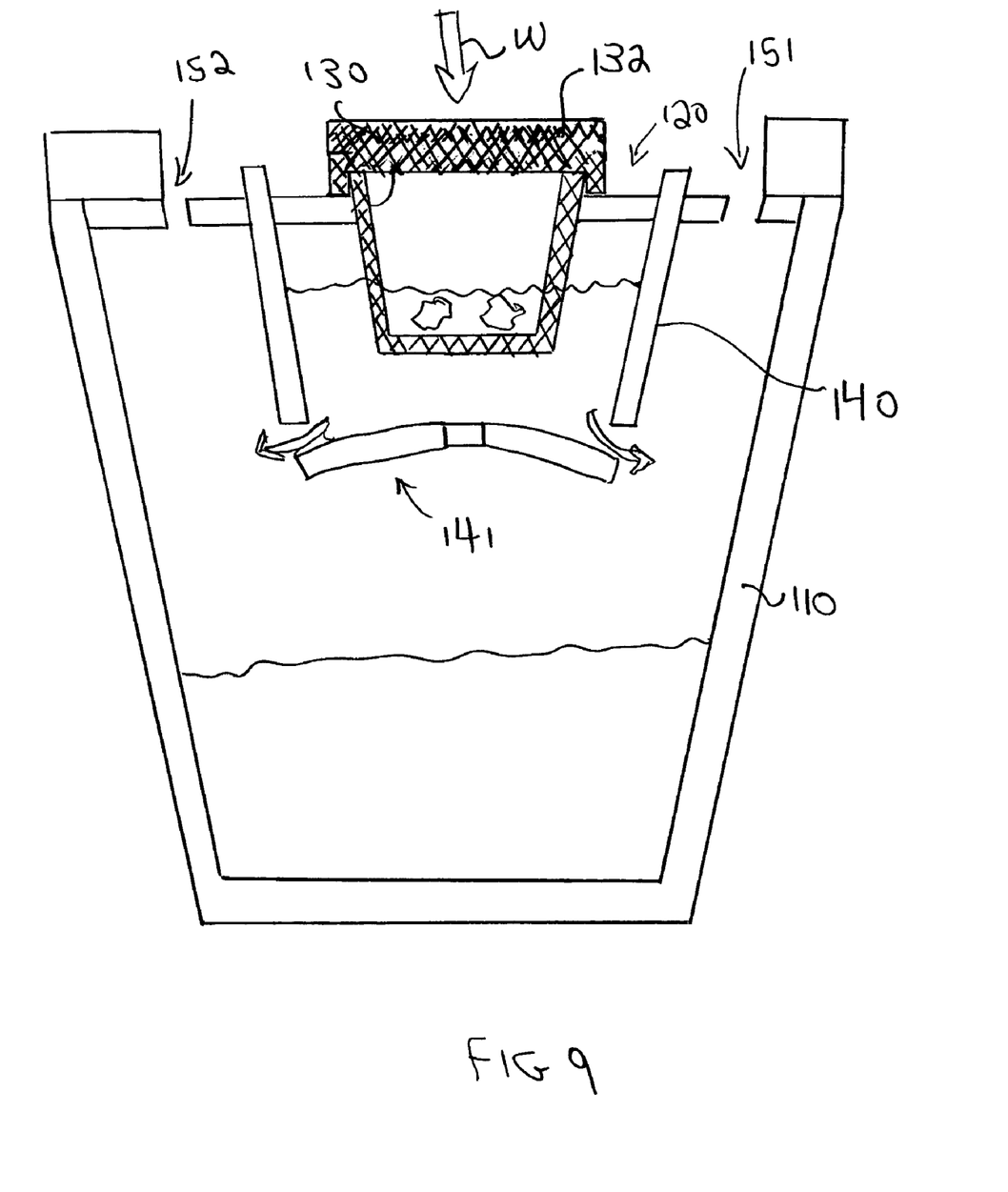
FIG. 9 is an illustration of the device of FIG. 8, showing the one-way flow valve in an open position.
Figure 10:
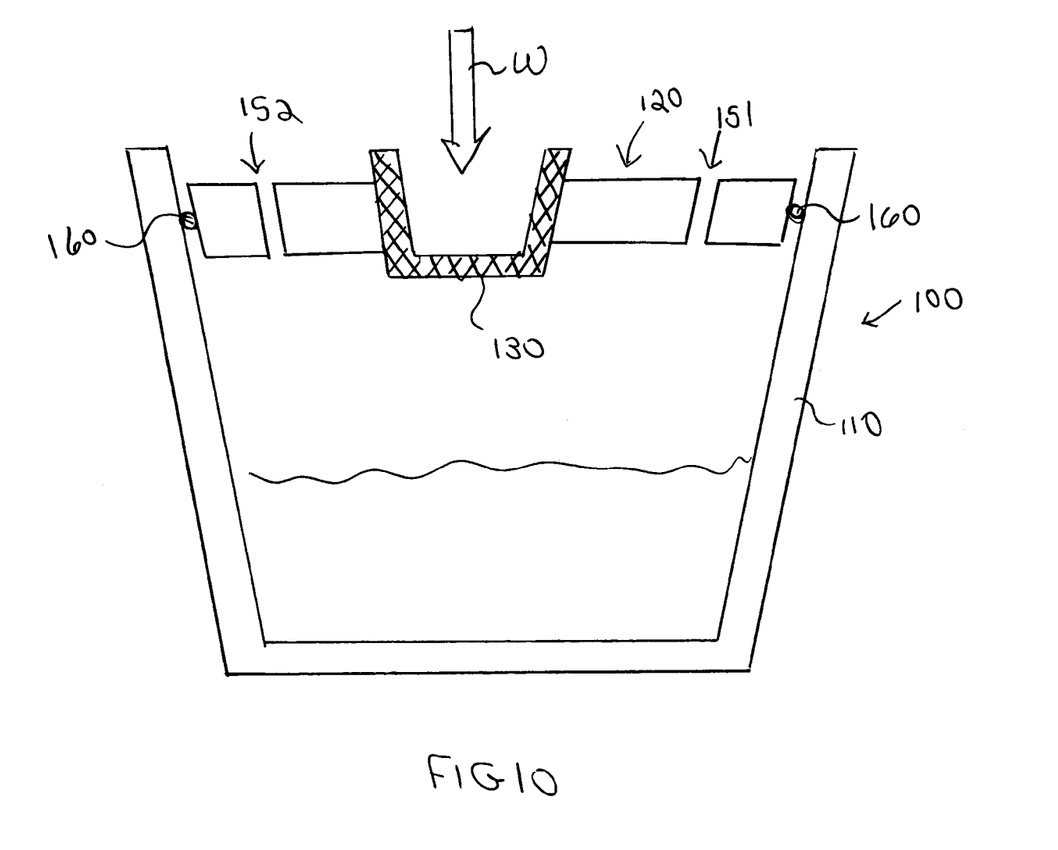
FIG. 10 is a sectional side elevation view of yet another preferred embodiment of present beverage container ready for drinking therefrom. This embodiment incorporates an O-ring seal around a removable lid.
Figure 11:
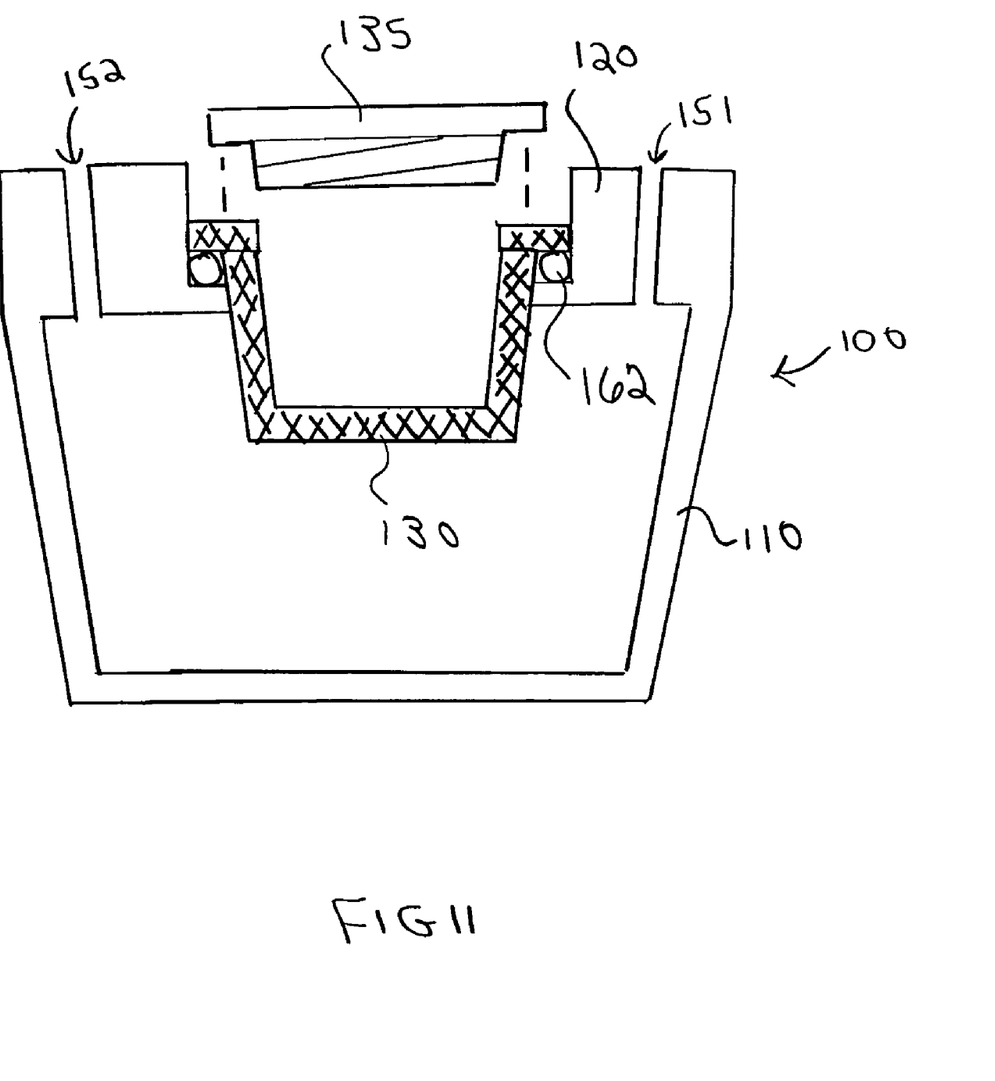
FIG. 11 is a sectional side elevation view of yet another preferred embodiment of present beverage container ready for drinking therefrom. This embodiment incorporates an O-ring seal around the filter, and a screw top on the lid.

FIGS. 1 to 6 illustrate a first embodiment of the present invention. FIG. 7 illustrates a second embodiment of the invention. FIGS. 8 and 9 illustrate a third embodiment of the invention. FIG. 10 illustrates a fourth embodiment of the invention. FIG. 11 illustrates a fifth embodiment of the invention.

Figure 1:
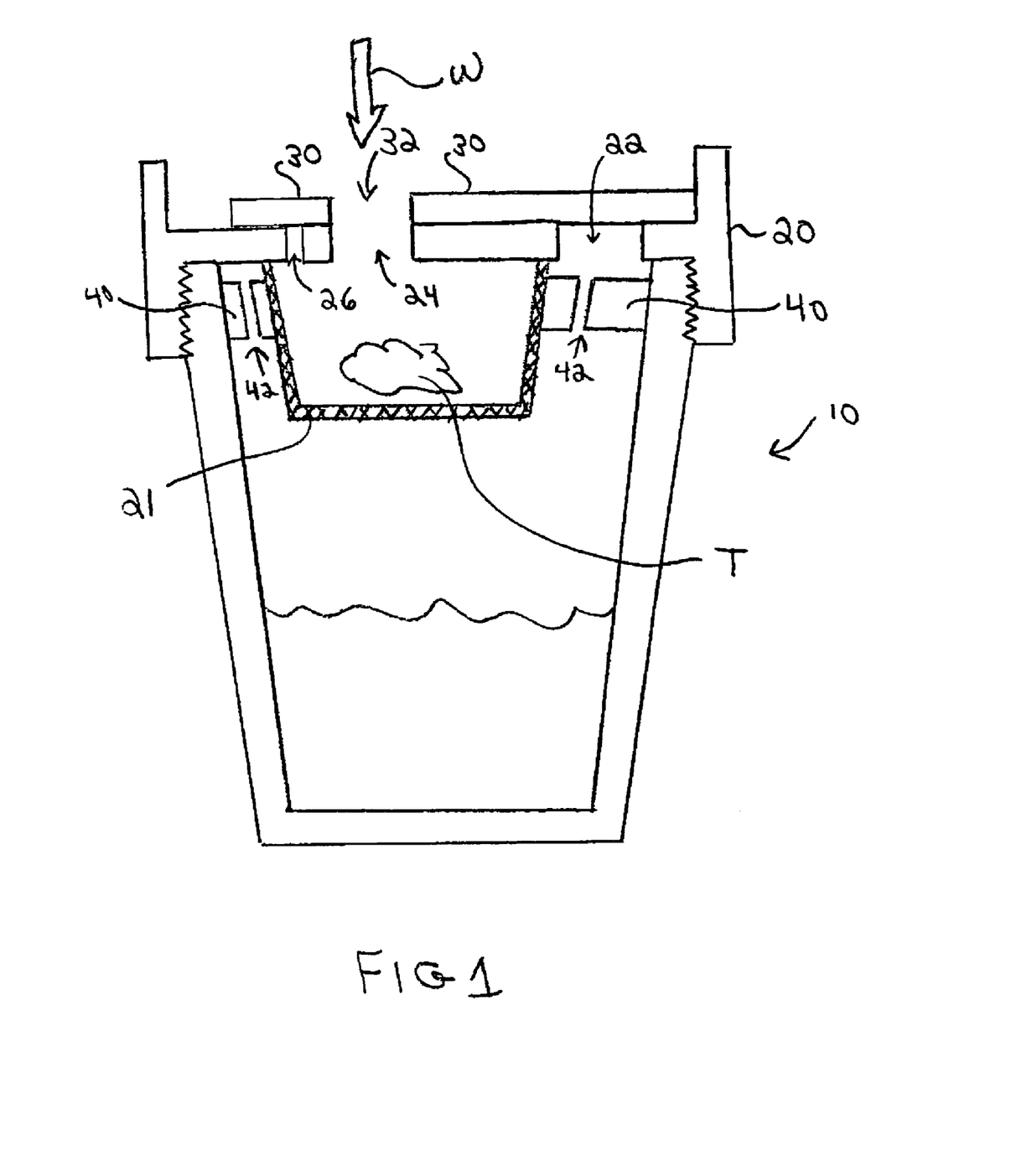
FIG. 1 is a sectional side elevation view of a preferred embodiment of present beverage container being filled for use.
Figure 2:
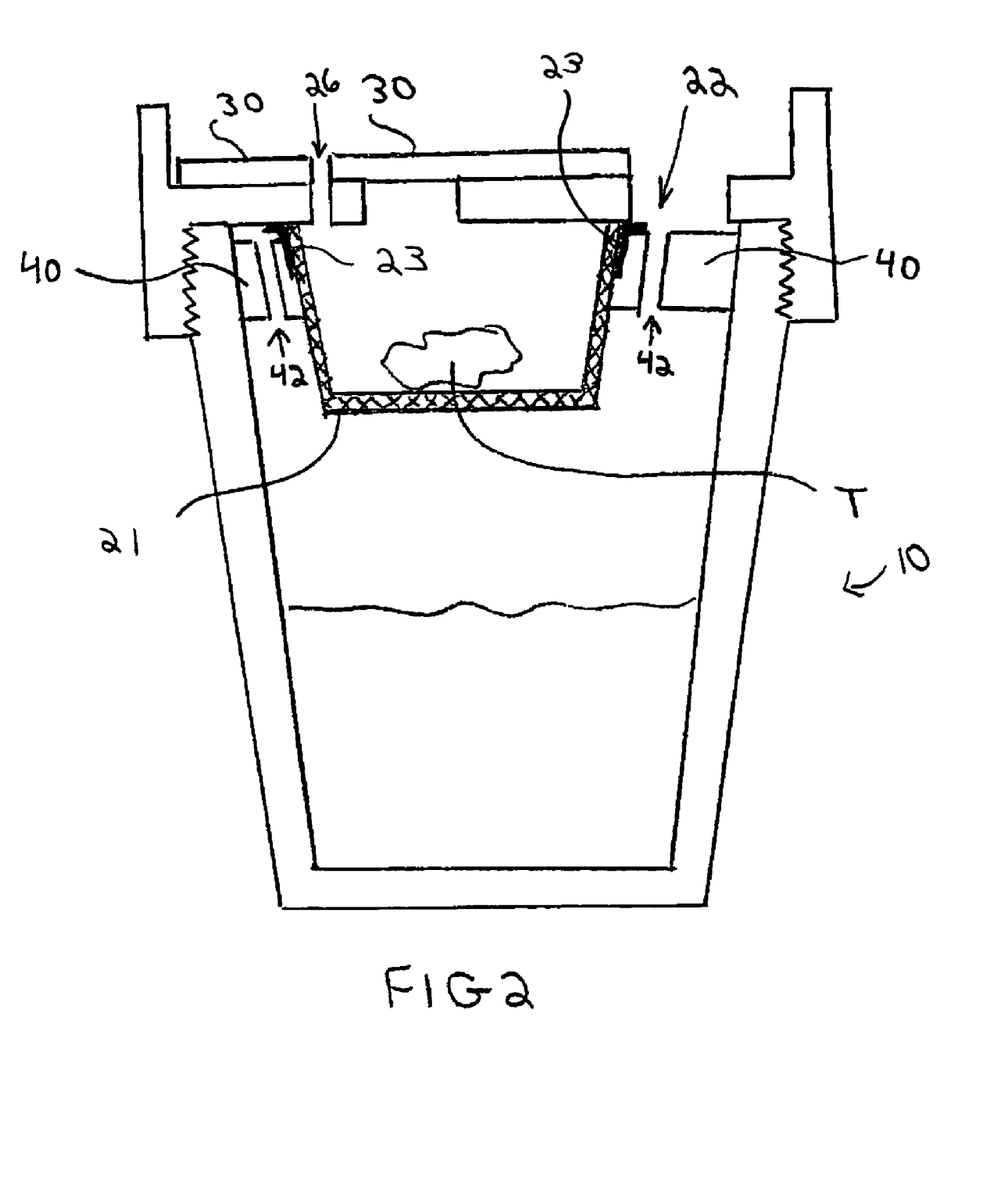
FIG. 2 is a sectional side elevation view of the device of FIG. 1 ready for drinking therefrom.
Figure 3:
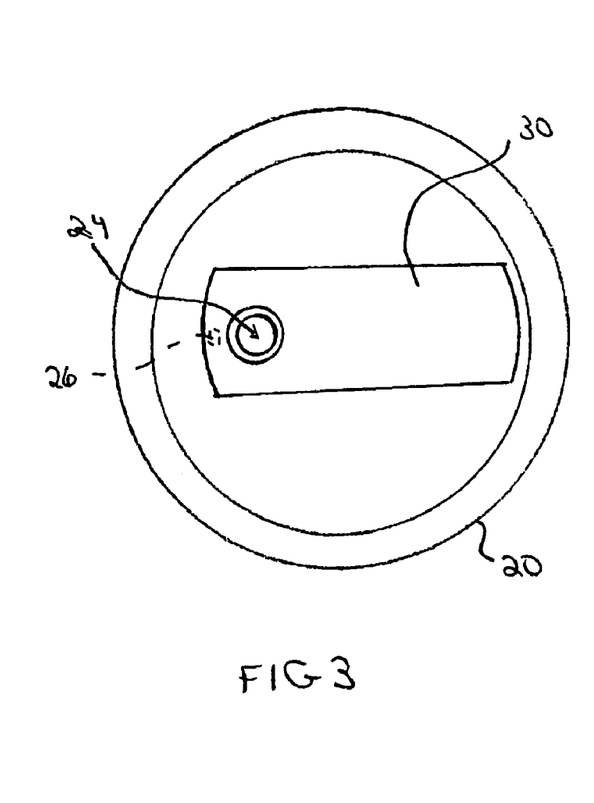
FIG. 3 is a top plan view corresponding to FIG. 1. Hidden features are shown in dotted lines.
Figure 4:
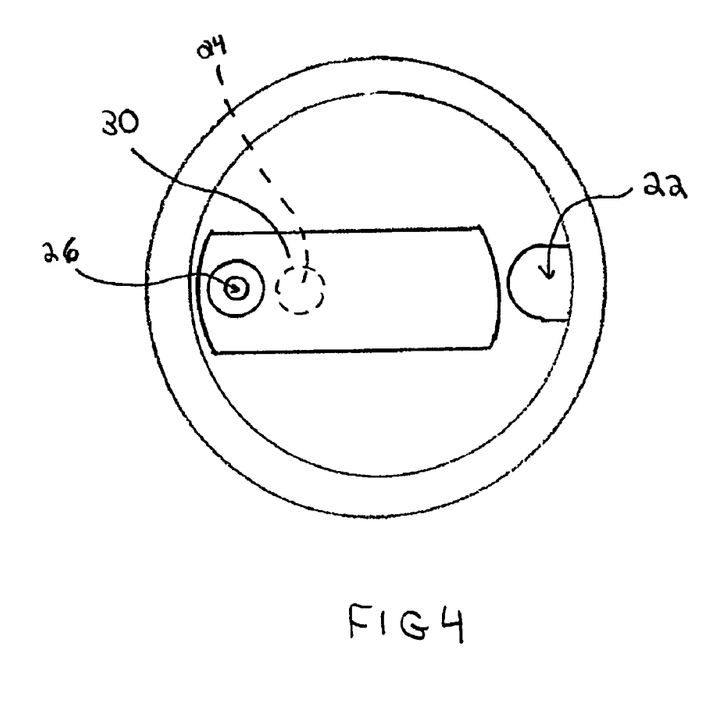
FIG. 4 is a top plan view corresponding to FIG. 2. Hidden features are shown in dotted lines.

Referring first to FIGS. 1 to 6, beverage container (i.e.: cup) 10 has a screw-on (or pop-on) lid 20. Lid 20 has a large drinking hole 22, a large pour-in hole 24 and a small pressure release hole 26 passing therethrough. In each of the illustrated embodiments of the invention, an optional flange 23 may be provided around filter 21 to prevent filter 21 from moving around and rattling in the device. Flange 21 is illustrated in FIGS. 2, 7 and 8. (In FIG. 7, flange 23 sits on op of O-ring 50.)

Lid 20 also has a moveable slider 30 mounted thereon. Slider 30 has a hole 32 passing therethrough. In the slider 30 position shown in FIGS. 1 and 3, water W is poured through holes 32 and 24 into filter 21. Filter 21 may be a wire mesh basket, may optionally be made of stainless steel, plastic with holes therein or any porous membrane. Water W mixes with tea leaves T (or possibly coffee grinds), and forms a pleasing beverage in the beverage container.

The present wire cloth filter 21 may optionally have a density of at least 325 strands per square inch, or more preferably, at least 375 strands per square inch. Most preferably, the present wire cloth filter may have a density of at least 400 strands per square inch. The present wire cloth filter may be made of stainless steel, and may optionally be gold plated.

In accordance with the present invention, the wire cloth or mesh filter 21 may comprise a woven or perforated metal. Alternatively, the wire cloth may comprise cotton canvas, or heat-resistant plastic threaded in cloth form.

Thereafter, slider 30 is moved to the position shown in FIG. 2. In this position, pour-in hole 24 is sealed by slider 30 and drinking hole 22 and pressure release hole 26 is opened. At this time, the person tilts the beverage container and drinks the beverage through hole 22. Air flows into hole 26 to ensure an even flow of the beverage to the user.

FIG. 5 illustrates a top plan view with lid 20 removed. An insert 40 is seen. Insert 40 includes a plurality of openings 42 passing therethrough. Insert 40 supports wire mesh filter 21 therein. Water is poured directly into wire mesh 21, and the resulting beverage seeps out through holes 42 when the container is tilted over for use. After seeping up through holes 42, the beverage then passes out through drinking hole 22 in lid 22 (not shown). FIG. 6 illustrates a variation of the embodiment of the invention in which wire mesh filter 21 is an integral part of insert 40. In optional embodiments, filter 21 is part of lid 20.

FIG. 7 illustrates another alternate embodiment of the invention in which insert 40 is supported at its top end by an O-ring seal 50.

FIGS. 8 and 9 illustrate an embodiment of the invention in which beverage cup assembly 100 comprises a cup 110 having a lid 120. Lid 120 supports a wire mesh filter 130 therein. Filter 130 has a top 132. In preferred embodiments, top 130 is also made of a wire mesh. A fluid receptacle 140 surrounds wire mesh filter 130. Receptacle 140 comprises a one-way valve 141.

In operation, a user places coffee grains C or tea leaves into filter 130. Top 132 is then screwed, snapped or otherwise placed onto filter 130. Next, as shown in FIG. 9, a user then pours hot water W therein. Water then partially fills receptacle 140, permitting the beverage to brew therein. The bottom of receptacle 140 operates as a one-way valve 141 that opens slightly to permit the brewed beverage to seep out of the bottom of receptacle 140, and into cup 110. One-way valve 141 may be constructed in many different ways, and the present invention is not limited to any particular embodiment. In one exemplary embodiment, one-way valve is simply a cut section in the bottom of receptacle 140 that bends to open under the weight of the water therein. The advantage of one-way valve 141 is that it slows the passage of liquid into the cup 110 (such that it remains in receptacle 140 for a sufficient time for beverage brewing).

After the beverage has been brewed, the user simply tilts the cup, and drinks the beverage through hole 151 or 152. For example, if the user drinks the beverage through hole 151, air enters through hole 152. One-way valve 141 will close, such that fluid in cup 110 does not pass back out through filter 130 and top 132. In addition, the presence of filter top 132 will prevent the coffee grains C (or tea leaves) from spilling out of the top of the device into the user's face.

FIG. 10 shows an embodiment of the invention (with top 132 removed). The device of FIG. 10 is similar to that of FIG. 9, with the exception that lid 120 is inserted into cup 110, instead having an O-ring seal 160 around the sides of lid 120.

FIG. 11 illustrates an embodiment of the invention in which filter 130 is positioned on top of an O-ring 162 in lid 120. A lid 135 may be a screw on-type lid (as shown). In use, a user removes top 135 and pours hot water over coffee grains (or tea leaves) sitting therein. After the beverage has brewed, the user then screws top 135 into lid 120 (and onto filter 130). Then, the user simply tilts the cup 110, and drinks through either of holes 151 and 152 (as air enters cup 110 through the other of holes 151 and 152). In one embodiment, lid 135 is a solid block of material. In another embodiment, lit 135 is a mesh filter.

As can be appreciated, many other design possibilities are possible, all keeping within the scope of the present invention.

What is claimed:

1. A beverage cup assembly, comprising:
    a cup;
    a lid at a top of the cup; and
    a filter assembly adjacent to the lid, wherein the filter assembly comprises a removable top, and wherein the removable top comprises a wire mesh.

2. A beverage cup assembly, comprising:
    a cup;
    a lid at a top of the cup;
    a filter assembly adjacent to the lid; and
    a receptacle receivable around the filter assembly, wherein the receptacle comprises a one-way valve permitting fluid to flow from the receptacle into the cup.

3. The beverage cup of claim 2, wherein the one-way valve is a flap in the receptacle.

* * * * *